United States Patent
Guo

(10) Patent No.: US 9,730,071 B1
(45) Date of Patent: Aug. 8, 2017

(54) SYSTEMS AND METHODS FOR CONNECTING PURPOSE-BUILT APPLIANCES TO SECURE WIRELESS NETWORKS

(71) Applicant: Symantec Corporation, Mountain View, CA (US)

(72) Inventor: Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/640,015

(22) Filed: Mar. 5, 2015

(51) Int. Cl.
H04W 12/06 (2009.01)
H04W 12/08 (2009.01)
H04W 76/02 (2009.01)
H04L 9/32 (2006.01)

(52) U.S. Cl.
CPC .......... *H04W 12/08* (2013.01); *H04W 12/06* (2013.01); *H04W 76/021* (2013.01)

(58) Field of Classification Search
CPC .. H04W 12/06; H04W 84/12; H04L 63/0892; H04M 2203/6072
See application file for complete search history.

(56) References Cited

U.S. PATENT DOCUMENTS

| | | | | |
|---|---|---|---|---|
| 2004/0123016 | A1* | 6/2004 | Doblar | G06F 13/4234 711/5 |
| 2006/0206709 | A1* | 9/2006 | Labrou | G06Q 20/18 713/167 |
| 2013/0024914 | A1* | 1/2013 | Ahmed | H04L 63/102 726/4 |
| 2014/0059351 | A1* | 2/2014 | Braskich | G06F 21/36 713/171 |
| 2014/0282990 | A1* | 9/2014 | Engelhart | H04L 63/08 726/9 |
| 2014/0337957 | A1* | 11/2014 | Feekes | H04L 63/0853 726/9 |

(Continued)

OTHER PUBLICATIONS

A New Authentication and Key Management Scheme of WLAN. Zhang et al. IEEE(2006).*

(Continued)

*Primary Examiner* — Venkat Perungavoor
(74) *Attorney, Agent, or Firm* — FisherBroyles LLP

(57) ABSTRACT

The disclosed computer-implemented method for connecting purpose-built appliances to secure wireless networks may include (1) receiving, via an unsecured wireless network, an identifier from a network device that is not connected to a secure wireless network associated with the computing device, (2) sending, via the unsecured wireless network, a token to the network device, (3) receiving confirmation from a user of the network device that the network device correctly displayed the token and that the user would like to connect the network device to the secure wireless network, and (4) in response to the confirming that the user would like to connect the network device to the secure wireless network, sending, via the unsecured wireless network, network credentials for the secure wireless network to the network device to enable the network device to connect to the secure wireless network. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2015/0143125 A1* | 5/2015 | Nix | ................... | H04W 52/0235 |
| | | | | 713/171 |
| 2015/0221149 A1* | 8/2015 | Main | ................... | G07C 9/00119 |
| | | | | 340/5.61 |
| 2015/0302732 A1* | 10/2015 | Wright | ................... | G08C 17/02 |
| | | | | 340/5.25 |
| 2015/0373538 A1* | 12/2015 | Huang | ................... | H04N 7/181 |
| | | | | 726/5 |
| 2016/0036819 A1* | 2/2016 | Zehavi | ................... | H04L 63/10 |
| | | | | 726/4 |

OTHER PUBLICATIONS

Detecting and Blocking Unauthorized access in Wi-Fi Networks. Xia et al. LNCS(2004).*
CN101998406A-English Translation. Mar. 30, 2011.*
Consolidated Identity Management System for secure mobile cloud computing. Khalil et al. Elsevier(2014).*
Adam Glick; Systems and Methods for Protecting Purpose-Built Appliances on Local Networks; U.S. Appl. No. 14/570,356, filed Dec. 15, 2014.
"How do I connect my Nest Protect to Wi-Fi and my Nest Account?", https://nest.com/support/article/How-do-I-connect-my-Nest-Protect-Wi-fi-and-my-Nest-Account#connect, as accessed Jan. 20, 2015, Nest Labs, (On or before Jan. 20, 2015).
"Bluetooth", https://en.wikipedia.org/wiki/Bluetooth, as accessed Jan. 20, 2015, Wikipedia, (Jan. 30, 2004).
"IEEE 802.11w-2009", https://en.wikipedia.org/wiki/IEEE_802.11w-2009, as accessed Jan. 20, 2015, Wikipedia, (Dec. 13, 2011).

* cited by examiner

SYSTEMS AND METHODS FOR CONNECTING PURPOSE-BUILT APPLIANCES TO SECURE WIRELESS NETWORKS

BACKGROUND

Computing devices are no longer limited to just servers, desktops, and laptops, but are increasingly found in phones, watches, and even eyeglasses. For example, many appliances around the home now incorporate a growing array of computing functions, such as thermostats that can be programmed remotely and refrigerators with touchscreens for looking up and displaying recipes. The ideal smart home is composed of numerous networked smart appliances that can be controlled over a home network and can perform a variety of tasks for enhancing a home's convenience and safety. Every day this ideal is moving closer to becoming a reality, and with this new reality comes new challenges in ensuring that smart appliances are at least as convenient for users as their non-networked predecessors.

While some smart appliances and devices are designed to be connected to a home's wired network, a growing number of smart appliances are designed to connect to wireless networks. Traditional methods for connecting smart appliances to wireless networks typically require a user to manually input the name and/or password of the desired wireless network on the device in question. Unfortunately, this process can be difficult and/or tedious on devices that have user interfaces that were not designed for typing, such as printers, refrigerators, and thermostats. While some traditional systems attempt to avoid this by broadcasting network credentials to smart devices, these systems often lack the security features necessary to prevent rogue devices from acquiring the network's credentials. Accordingly, the instant disclosure identifies and addresses a need for additional and improved systems and methods for conveniently and securely connecting purpose-built appliances, such as smart appliances, to secure wireless networks.

SUMMARY

As will be described in greater detail below, the instant disclosure describes various systems and methods for connecting purpose-built appliances to secure wireless networks by sending the credentials for a secure wireless network to a purpose-built appliance via a secure channel on an unsecured wireless network after having confirmed, via a token-generation process, a user's intent to connect the purpose-built appliance to the secure wireless network.

In one example, a computer-implemented method for connecting purpose-built appliances to secure wireless networks may include, on a computing device such as a router, (1) receiving, via an unsecured wireless network, an identifier from a network device that is not connected to a secure wireless network associated with the computing device, (2) sending, via the unsecured wireless network, an authentication token to the network device, (3) receiving confirmation from a user of the network device that the network device correctly displayed the authentication token and that the user would like to connect the network device to the secure wireless network, and (4) in response to confirming that the user would like to connect the network device to the secure wireless network, sending, via the unsecured wireless network, network credentials for the secure wireless network to the network device to enable the network device to connect to the secure wireless network.

In some examples, sending the network credentials for the secure wireless network to the network device may enable the network device to connect to the secure wireless network without requiring the user to manually input the network credentials on the network device. For example, sending the network credentials may cause the network device to automatically connect to the secure wireless network.

In one embodiment, the computing device may include a network router that broadcasts the unsecured wireless network. Additionally or alternatively, the computing device may include a router add-on device.

In some embodiments, sending, via the unsecured wireless network, the authentication token to the network device may include sending the authentication token via a secure channel. In some examples, receiving the confirmation from the user of the network device that the network device correctly displayed the authentication token may include displaying to the user the authentication token and/or a list of network devices currently connected to the unsecured wireless network.

In one embodiment, the computer-implemented method may further include, in response to receiving the identifier of the network device, sending an Internet Protocol (IP) address for the network device to the network device. In some embodiments, the computing device may first send the IP address and then send the authentication token.

From the perspective of a network device (such as a purpose-built appliance), a computer-implemented method for connecting purpose-built appliances to secure wireless networks may include (1) identifying and connecting to an unsecured wireless network, (2) sending, via the unsecured wireless network, an identifier of the network device to a computing device that is associated with the unsecured wireless network, (3) receiving, via the unsecured wireless network, an authentication token from the computing device, (4) displaying the authentication token to a user of the network device, (5) receiving, via the unsecured wireless network, network credentials for a secure wireless network from the computing device in response to a user of the computing device confirming that the network device correctly displayed the authentication token and that the user of the network device would like to connect the network device to the secure wireless network, and (6) connecting to the secure wireless network using the network credentials received via the unsecured wireless network.

In some embodiments, the network device may include a purpose-built appliance with a limited user interface for entering the network credentials. In some examples, connecting to the secure wireless network using the network credentials may include using the network credentials to connect to the secure wireless network without the user manually inputting the network credentials on the network device.

In some examples, displaying the authentication token may include flashing a light to indicate that the authentication token is being displayed. Displaying the authentication token may also include producing a noise to indicate that the authentication token is being displayed.

In some embodiments, the computer-implemented method may further include, in response to sending the identifier of the network device to the computing device, receiving an IP address for the network device from the computing device. In some examples, the identifier of the network device may include (1) a name of the device, (2) a manufacturer of the device, and/or (3) a media access control address (MAC) of the device.

In some examples, identifying and connecting to the unsecured wireless network may include determining that the unsecured wireless network has the strongest signal of any available unsecured wireless network. In other examples, identifying and connecting to the unsecured wireless network may include receiving input from the user that directs the network device to connect to the unsecured wireless network. Additionally or alternatively, identifying and connecting to the unsecured wireless network may include connecting to each available unsecured wireless network in turn for a predefined time period until an authentication token is received via the unsecured wireless network.

In one embodiment, a system for implementing the above-described methods may include (1) an identification module, stored in memory of a network device, that identifies an unsecured wireless network and connects the network device to the unsecured wireless network, (2) an identifier sending module, stored in memory of the network device, that sends, via the unsecured wireless network, an identifier of the network device to a computing device that is associated with the unsecured wireless network, (3) an identifier-receiving module, stored in memory of the computing device that receives, via the unsecured wireless network, the identifier from the network device, (4) a token-sending module, stored in memory of the computing device, that sends, via the unsecured wireless network, an authentication token to the network device, (5) a token-receiving module, stored in memory of the network device, that receives, via the unsecured wireless network, the authentication token from the computing device, (6) a displaying module, stored in memory of the network device, that displays the authentication token to a user of the network device, (7) a confirmation module, stored in memory of the computing device, that receives confirmation from the user of the network device that the network device correctly displayed the authentication token and that the user would like to connect the network device to the secure wireless network, (8) a credential-sending module, stored in memory of the computing device, that, in response to the confirming that the user would like to connect the network device to the secure wireless network, sends, via the unsecured wireless network, network credentials for the secure wireless network to the network device, (9) a credential-receiving module, stored in memory of the network device, that receives, via the unsecured wireless network, the network credentials for the secure wireless network from the computing device, (10) a connection module, stored in memory of the network device, that connects the network device to the secure wireless network using the network credentials received via the unsecured wireless network, and (11) at least one physical processor configured to execute the identification module, the identifier-sending module, the identifier-receiving module, the token-sending module, the token-receiving module, the displaying module, the confirmation module, the credential-sending module, the credential-receiving module, and the connection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, via an unsecured wireless network, an identifier from a network device that is not connected to a secure wireless network associated with the computing device, (2) send, via the unsecured wireless network, an authentication token to the network device, (3) receive confirmation from a user of the network device that the network device correctly displayed the authentication token and that the user would like to connect the network device to the secure wireless network, and (4) send, in response to the confirming that the user would like to connect the network device to the secure wireless network, network credentials for the secure wireless network to the network device to enable the network device to connect to the secure wireless network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
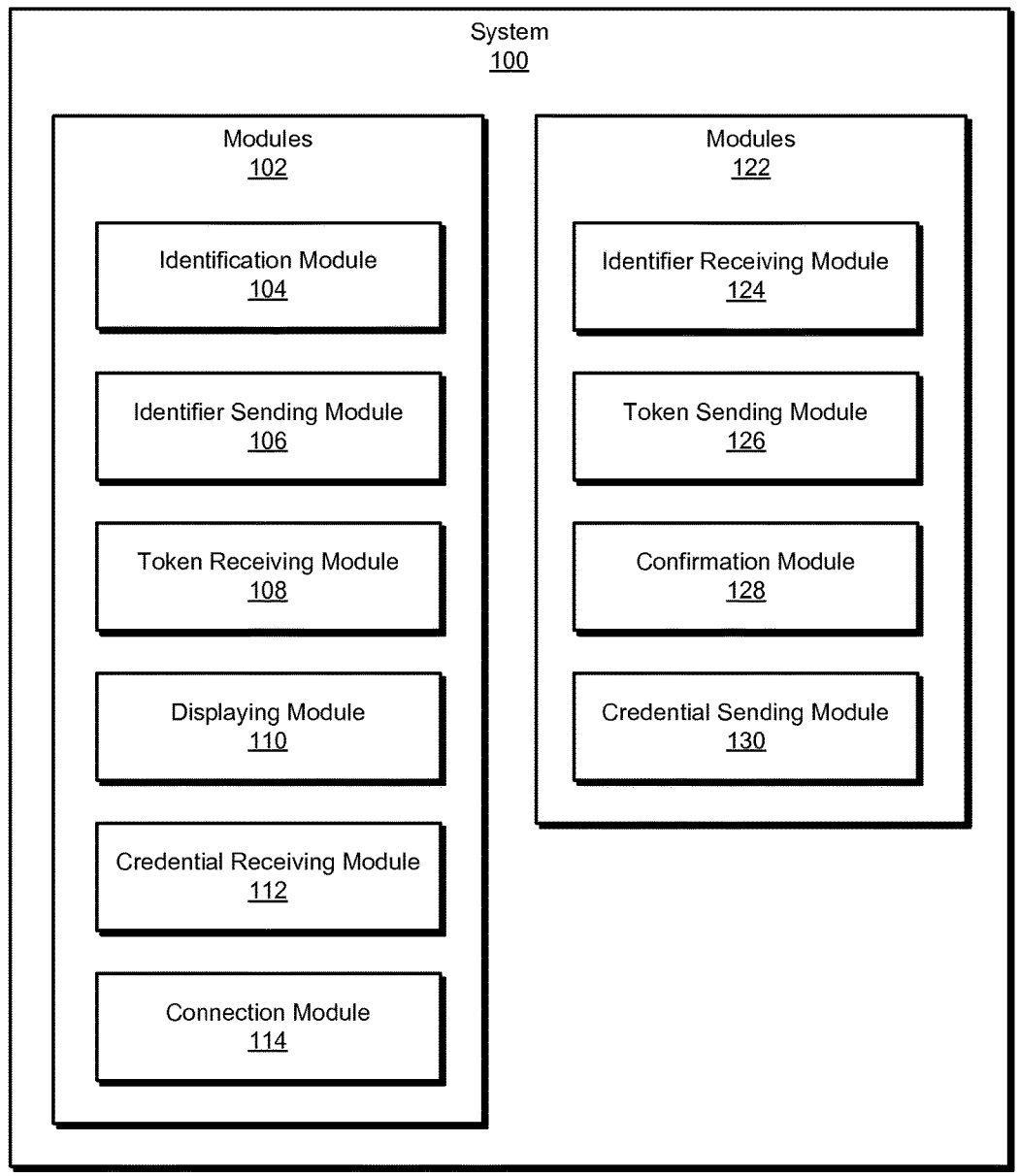
FIG. 1 is a block diagram of an exemplary system for connecting purpose-built appliances to secure wireless networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for connecting purpose-built appliances to secure wireless networks. As will be explained in greater detail below, by sending secure wireless network credentials to a purpose-built appliance via a secure channel on an unsecured wireless network after having confirmed, via a token-generation process, that a user of the secure wireless network wishes to connect the purpose-built appliance in question to the secure wireless network, the systems described herein may enable users to connect purpose-built appliances to their home wireless networks in a secure fashion with minimal inconvenience.

Figure 2:
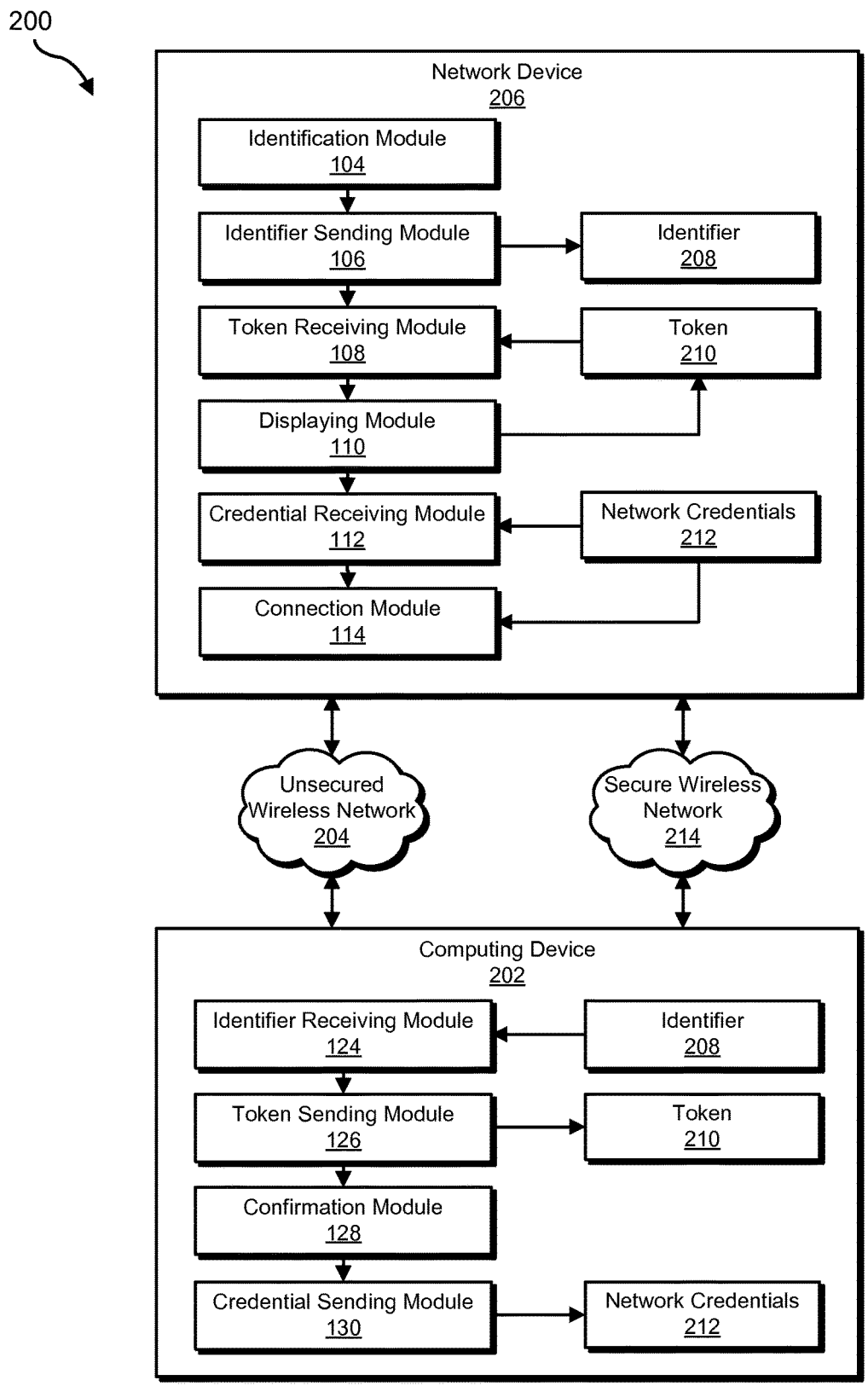
FIG. 2 is a block diagram of an additional exemplary system for connecting purpose-built appliances to secure wireless networks.

The following will provide, with reference to FIGS. 1-2, detailed descriptions of exemplary systems for connecting purpose-built appliances to secure wireless networks. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for connecting purpose-built appliances to secure wireless networks. As illustrated in this figure, exemplary system 100 may include one or more computing-device-specific modules 122 for performing one or more tasks. For example, and as will be explained in greater detail below, exemplary system 100 may include an identifier-receiving module 124 that may, when executed by a computing device such as a router, receive, via an unsecured wireless network, an identifier from a network device that is not connected to a secure wireless network associated with the computing device. Exemplary system 100 may additionally include a token-sending module 126 that may send, via the unsecured wireless network, an authentication token to the network device. Exemplary system 100 may also include a confirmation module 128 that may receive confirmation from a user of the network device that the network device correctly displayed the authentication token and that the user would like to connect the network device to the secure wireless network. Exemplary system 100 may additionally include a credential-sending module 130 that may, in response to the confirming that the user would like to connect the network device to the secure wireless network, send, via the unsecured wireless network, network credentials for the secure wireless network to the network device to enable the network device to connect to the secure wireless network.

Exemplary system 100 may also include one or more network-device-specific modules 102 for performing one or more tasks. For example, and as will be explained in greater detail below, exemplary system 100 may include an identification module 104 that may, when executed by a network device such as a smart appliance, identify an unsecured wireless network and connect the network device to the unsecured wireless network. Exemplary system 100 may additionally include an identifier-sending module 106 that may send, via the unsecured wireless network, an identifier of the network device to a computing device that is associated with the unsecured wireless network. Exemplary system 100 may also include a token-receiving module 108 that may receive, via the unsecured wireless network, the authentication token from the computing device. Exemplary system 100 may additionally include a displaying module 110 that may display the authentication token to a user of the network device.

Exemplary system 100 may also include a credential-receiving module 112 that may receive, via the unsecured wireless network, the network credentials for the secure wireless network from the computing device. Exemplary system 100 may additionally include a connection module 114 that may connect the network device to the secure wireless network using the network credentials received via the unsecured wireless network. Although illustrated as separate elements, one or more of modules 102 and/or 122 in FIG. 1 may represent portions of a single module or application.

In certain embodiments, one or more of modules 102 and/or 122 in FIG. 1 may represent one or more software applications or programs that, when executed by a computing device, may cause the computing device to perform one or more tasks. For example, and as will be described in greater detail below, one or more of modules 102 and/or 122 may represent software modules stored and configured to run on one or more computing devices, such as the devices illustrated in FIG. 2 (e.g., computing device 202 and/or network device 206), computing system 710 in FIG. 7, and/or portions of exemplary network architecture 800 in FIG. 8. One or more of modules 102 and/or 122 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a network device 206 via an unsecured wireless network 204. In one example, computing device 202 may be programmed with one or more of modules 122. Additionally or alternatively, network device 206 may be programmed with one or more of modules 102.

In one embodiment, one or more of modules 102 and/or 122 from FIG. 1 may, when executed by at least one processor of computing device 202 and/or network device 206, enable purpose-built appliances to conveniently and securely connect to secure wireless networks. For example, and as will be described in greater detail below, identification module 104 may automatically identify and connect network device 206 to unsecured wireless network 204. After the connection has been established, identifier-sending module 106 may send, via unsecured wireless network 204, an identifier 208 of network device 206 to a computing device 202 that is associated with unsecured wireless network 204. Next, identifier-receiving module 124 on computing device 202 may receive, via unsecured wireless network 204, identifier 208 from network device 206. In response to receiving identifier 208, token-sending module 126 may send, via unsecured wireless network 204, a token 210 to network device 206. Next, token-receiving module 108 on network device 206 may receive, via unsecured wireless network 204, token 210 from computing device 202 and displaying module 110 may display token 210 to a user of network device 206.

After network device 206 has displayed token 210, confirmation module 128 on computing device 202 may receive confirmation from the user of network device 206 that network device 206 correctly displayed token 210 and that the user would like to connect network device 206 to secure wireless network 214. Credential-sending module 130 may then, in response to the confirming that the user would like to connect network device 206 to secure wireless network 214, send, via unsecured wireless network 204, network credentials 212 for secure wireless network 214 to network device 206 to enable network device 206 to connect to secure wireless network 214.

After computing device 202 has sent network credentials 212, credential-receiving module 112 on network device 206 may receive, via unsecured wireless network 204, network credentials 212 for secure wireless network 214 from computing device 202. Finally, connection module 114 may connect network device 206 to secure wireless network 214 using network credentials 212 received via unsecured wireless network 204.

Computing device 202 generally represents any type or form of computing device capable of reading computer-executable instructions and/or sending messages via a network. Examples of computing device 202 include, without limitation, routers, router add-ons, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Network device 206 generally represents any type or form of computing device that is capable of connecting to a network. In some embodiments, network device 206 may include a purpose-built appliance, also known as a "smart device," "Internet of Things device," and/or "smart appliance." In some examples, network device 206 may include a computing device such as a laptop or a tablet owned by a guest. Other examples of network device 206 include, without limitation, thermostats (e.g. the NEST thermostat), toasters, refrigerators, cameras, speakers, televisions, printers, lights, electronic locks, intercoms, ovens, microwaves, door openers, media servers, and/or any other appropriate networked device.

Unsecured wireless network 204 and/or secure wireless network 214 generally represent any medium or architecture capable of facilitating communication or data transfer. In some embodiments, unsecured wireless network 204 may include a wireless network that is not protected with a password, security key, or other security measure and/or that may be freely connected to by any computing device within range. Additionally or alternatively, secure wireless network 214 may include a wireless network that is protected with credentials, such as a password and/or security key. Examples of unsecured wireless network 204 and/or secure wireless network 214 include, without limitation, an intranet, a Wide Area Network (WAN), a Local Area Network (LAN), a Personal Area Network (PAN), the Internet, a cellular network (e.g., a Global System for Mobile Communications (GSM) network), exemplary network architecture 800 in FIG. 8, or the like. Unsecured wireless network 204 and/or secure wireless network 214 may facilitate communication or data transfer using wireless or wired connections. In one embodiment, unsecured wireless network 204 and/or secure wireless network 214 may facilitate communication between computing device 202 and network device 206.

Figure 3:
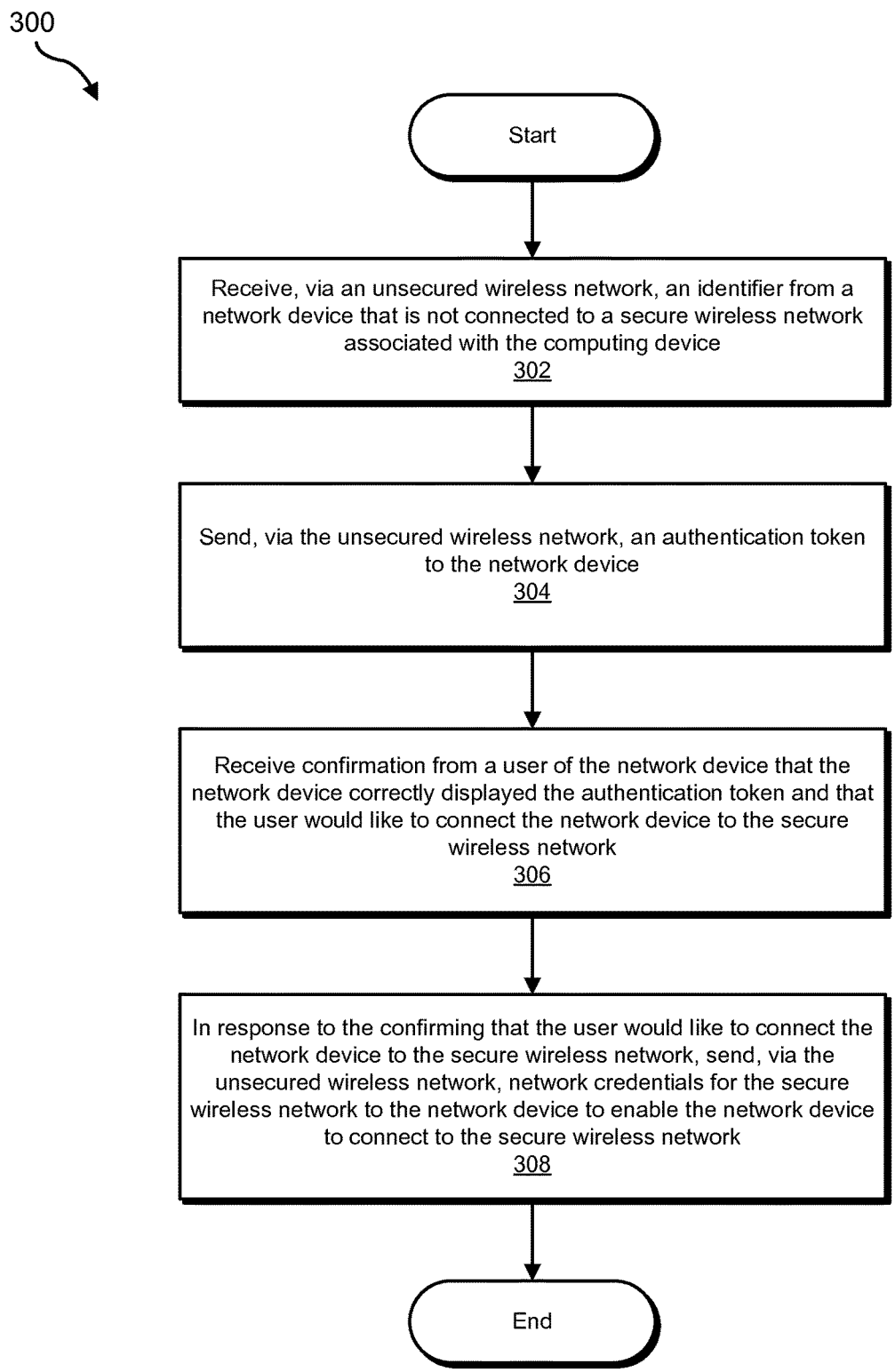
FIG. 3 is a flow diagram of an exemplary method for connecting purpose-built appliances to secure wireless networks.

FIG. 3 is a flow diagram of an exemplary computer-implemented method 300 for connecting purpose-built appliances to secure wireless networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8. In some examples, the steps shown in FIG. 3 may be performed by a computing device such as a router and/or a router add-on.

As illustrated in FIG. 3, at step 302, one or more of the systems described herein may receive, via an unsecured wireless network, an identifier from a network device that is not connected to a secure wireless network associated with the computing device. For example, identifier-receiving module 124 may, as part of computing device 202 in FIG. 2, receive, via unsecured wireless network 204, identifier 208 from a network device 206 that is not connected to secure wireless network 214 associated with computing device 202.

The term "identifier," as used herein, typically refers to any piece of information that may be used to identify a device. In some examples, an identifier may include a unique identifier that uniquely identifies a device, such as a serial number. In other examples, an identifier may merely distinguish a device from other similar devices, such as a brand name. Examples of such identifiers include, without limitation, a name of a device, a manufacturer of a device, and/or a MAC address of a device.

In addition, the term "computing device," as used herein, typically refers to any device that may send and receive messages over a network. In some embodiments, the computing device recited in step 302 may also broadcast one or more networks. For example, a computing device may represent a network router and/or a router add-on device that includes additional functionality such as random token generation and/or a display interface.

The term "network device," as used herein, typically refers to any device that may be connected to a network. In some embodiments, the network device may be a purpose-built appliance that does not include the full functionality of a standard computing device, such as a laptop or a desktop. For example, the network device may be a smart thermostat that may send and receive information via a network but may not have a full user interface for typing network passwords.

The term "unsecured wireless network," as used herein, typically refers to any wireless network that is not protected with a network key and/or password. In some embodiments, the unsecured wireless network may be broadcast solely for the purpose of sending credentials for a secure wireless network to purpose-built appliances. In these embodiments, the unsecured wireless network may not have Internet connectivity.

Identifier-receiving module 124 may receive the identifier of the network device in a variety of ways. For example, identifier-receiving module 124 may constantly monitor traffic on the unsecured wireless network for messages that may include device identifiers. In another example, a user may alert the computing device that includes identifier-receiving module 124 to expect a network device identifier in the near future.

At step 304, one or more of the systems described herein may send, via the unsecured wireless network, an authentication token to the network device. For example, token-sending module 126 may, as part of computing device 202 in FIG. 2, send, via unsecured wireless network 204, token 210 to network device 206.

The term "authentication token," as used herein, generally refers to any information sent by a computing device to a network device for the purposes of authentication. In some embodiments, the authentication token may include a small random number. In other embodiments, the authentication token may include a word, a phrase, a set of random letters, a mix of numbers and letters, and/or a sequence of sounds and/or light flashes to be repeated by the network device.

Token-sending module 126 may send the authentication token in a variety of ways. For example, token-sending module 126 may send both the authentication token and an IP address for the network device to the network device. In some examples, the token-sending module 126 may assign an IP address to the network device as soon as the network device connects to the unsecured network. In other examples, token-sending module 126 may assign an IP address to the network device in response to receiving the identifier from the network device.

In some embodiments, token-sending module 126 may send the IP address to the network device first, and then send the token via a secure channel. For example, token-sending module 126 may send the token in a hypertext transfer protocol secure (HTTPS) message using secure socket layer (SSL). In some embodiments, the network device may have a self-signed SSL certificate. In another embodiment, token-sending module 126 may use a protected management frame as a secure channel.

In some examples, a user may be attempting to connect multiple network devices simultaneously. In these examples, token-sending module 126 may send the same authentication token to each network device that sends an identifier within a certain timespan. For example, token-sending module 126 may send the same authentication token to every network device that sends an identifier within a ten minute window. Using the same authentication token may make things more convenient for a user who may only have to check that one authentication token matches rather than several.

In other embodiments, token-sending module 126 may send a separate authentication token to each network device. Using a separate authentication token for each network device may increase the security of the process by ensuring that no unwanted device is unwittingly sent credentials because some other device is displaying the correct token. Separate authentication tokens may also be necessary in cases where network devices have very different physical configurations. For example, an automatic door opener may not have a screen for displaying a token that includes a string while a security camera may not have indicator lights for displaying a token that includes a series of light flashes.

At step 306, one or more of the systems described herein may receive confirmation from a user of the network device that the network device correctly displayed the authentication token and that the user would like to connect the network device to the secure wireless network. For example, confirmation module 128 may, as part of computing device 202 in FIG. 2, receive confirmation from a user of network device 206 that network device 206 correctly displayed token 210 and that the user would like to connect network device 206 to secure wireless network 214.

Confirmation module 128 may receive confirmation from the user in a variety of ways. For example, a user may press a button on the computing device indicating that the network device correctly displayed the authentication token. In another example, a user may send a message to the device indicating that the network device correctly displayed the authentication token. For example, a user setting up a security camera by the front door may use a smartphone app to send a message to the router in the basement that the security camera has beeped the correct sequence to display the authentication token.

In some examples, confirmation module 128 may display to the user the authentication token and/or a list of network devices currently connected to the unsecured wireless network before receiving confirmation from the user. In some embodiments, confirmation module 128 may display the authentication token and/or list of network devices on a screen. In other embodiments, confirmation module 128 may send the information to a connected device, such as a desktop, laptop, or smart phone. For example, confirmation module 128 may be part of a router that does not have a screen and may therefore display the information on a laptop and/or text the information to the user's smartphone.

In some examples, confirmation module 128 may display the list of network devices connected to the unsecure wireless network to the user for security reasons. For example, a user who is not trying to connect a new network device may see that an unfamiliar device is connected to the unsecure wireless network and has sent an identifier and received an authentication token. In some embodiments, the user may have options other than denying that the correct network device has displayed the authentication token, such as blocking the unfamiliar device from the unsecured wireless network.

In other examples, confirmation module 128 may display the list of network devices for convenience purposes. For example, a user may be trying to connect multiple network devices to the secure wireless network. In this example, the user may be able to quickly verify that all the network devices have sent identifiers and received authentication tokens by checking the list of network devices displayed by confirmation module 128. If a network device that the user is trying to connect is not listed, the user may then check that the network device is activated, connected to the correct unsecured wireless network, and so forth. In embodiments where token-sending module 126 sends a separate authentication token to each network device that is being connected simultaneously, confirmation module 128 may display a list including an identifier of each network device and the authentication token that was sent to that network device.

At step 308, one or more of the systems described herein may, in response to the confirming that the user would like to connect the network device to the secure wireless network, send, via the unsecured wireless network, network credentials for the secure wireless network to the network device to enable the network device to connect to the secure wireless network. For example, credential-sending module 130 may, as part of computing device 202 in FIG. 2, and in response to the confirming that the user would like to connect network device 206 to secure wireless network 214, send, via unsecured wireless network 204, network credentials 212 for secure wireless network 214 to network device 206 to enable network device 206 to connect to secure wireless network 214.

The term "network credentials," as used herein, generally refers to any information that can be used to connect to an otherwise inaccessible secure wireless network. In some examples, network credentials may include a password, a key, and/or a network identifier.

Credential-sending module 130 module may send the network credentials in a variety of ways. For example, credential-sending module 130 may send the network credentials via a secure channel, such as HTTPS. In some examples, credential-sending module 130 may only send the network credentials if confirmation module 128 received confirmation from the user within a predefined time period after token-sending module 126 sent the authentication token. For example, credential-sending module 130 may only send the network credentials if the user confirmed that the network device displayed the token within five minutes of the token being sent.

After credential-sending module 130 sends the network credentials to the network device, the role of the computing device in the connection process may be over. The other portions of the process may be performed by one or more modules on a network device, such as a purpose-built appliance, also known as a smart appliance.

Figure 4:
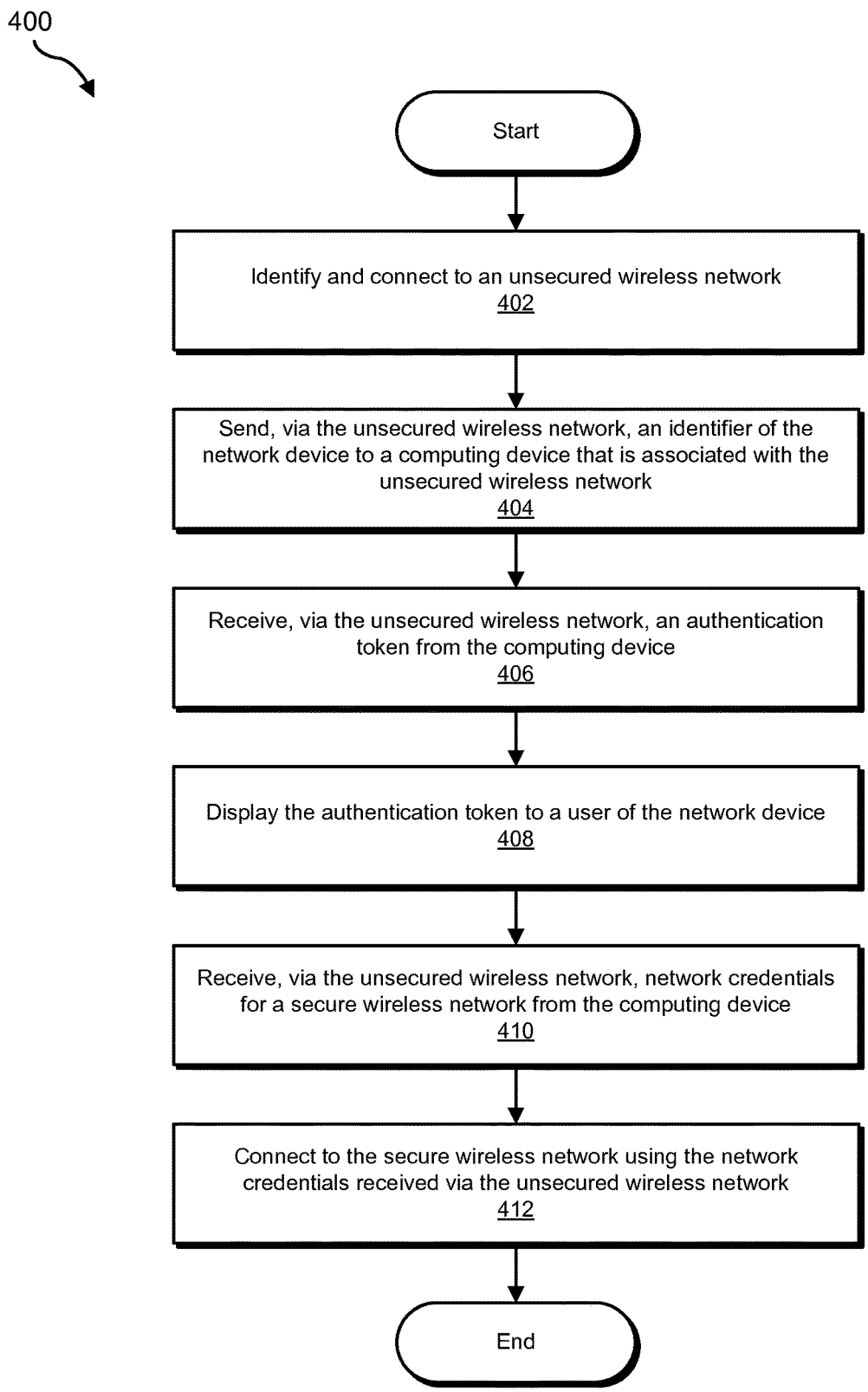
FIG. 4 is a flow diagram of an exemplary method for connecting purpose-built appliances to secure wireless networks.

FIG. 4 is a flow diagram of an exemplary computer-implemented method 400 for connecting purpose-built appliances to secure wireless networks. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 710 in FIG. 7, and/or portions of exemplary network architecture 800 in FIG. 8. In one example, the steps shown in FIG. 4 may be performed by a network device, such as a purpose-built appliance.

As illustrated in FIG. 4, at step 402, one or more of the systems described herein may identify and connect to an unsecured wireless network. For example, identification module 104 may, as part of network device 206 in FIG. 2, identify and connect to unsecured wireless network 204.

Identification module 104 may identify and connect to the unsecured wireless network in a variety of ways. For example, identification module 104 may automatically connect to the unsecured wireless network that has the strongest signal of any available unsecured wireless network. In some examples, a user may move the router that broadcasts the unsecured wireless network close to the network device or vice versa in order to cause the network device to automatically connect to the correct unsecured wireless network. In other examples, the unsecured wireless network may be the only unsecured wireless network in range. In some embodiments, the unsecured wireless network may be broadcast by the router or an add-on device for the purpose of sending network credentials to network device and/or the unsecured wireless network may not be connected to the Internet.

In other examples, identification module 104 may identify and connect to the unsecured wireless network by receiving input from the user that directs the network device to connect to the unsecured wireless network. For example, the user may select the correct unsecured wireless network from a list of available wireless networks displayed by the network device. In another example, the user may type the name of the unsecured wireless network on a keypad on the network device.

Additionally or alternatively, identification module 104 may identify and connect to the unsecured wireless network by connecting to each available unsecured wireless network in turn for a predefined time period until an authentication token is received via the unsecured wireless network. For example, there may be three unsecured wireless networks in range of the network device. In this example, the network device may connect to the first wireless network for five seconds, then the second wireless network for five seconds, then the third wireless network for five seconds, then the first wireless network again, and so forth, until the network device receives a message from the router indicating that this is the correct network (e.g., a message that includes an authentication token and/or an IP address, as described in greater detail below). In this example, the network device may also broadcast an identifier each time it connects to a network. After receiving the message, the network device may stay connected to the network through which the message was received.

In one embodiment, identification module 104 may be part of a network device that includes a purpose-built appliance with a limited user interface for entering network credentials. For example, the network device may lack an alphanumeric keyboard or may have a very limited user interface, such as a numeric keypad and/or several function selection buttons. For example, the network device may be a printer that has buttons for configuring the type of printing options but does not have a full keyboard. In another example, the network device may be a thermostat that includes only buttons for setting the temperature and a very small screen for displaying the current and/or selected temperature.

At step 404, one or more of the systems described herein may send, via the unsecured wireless network, an identifier of the network device to a computing device that is associated with the unsecured wireless network. For example, identifier-sending module 106 may, as part of network device 206 in FIG. 2, send, via unsecured wireless network 204, an identifier 208 of network device 206 to a computing device 202 that is associated with unsecured wireless network 204.

Identifier-sending module 106 may send the device identifier in a number of ways. For example, identifier-sending module 106 may broadcast the device identifier to any device connected to the unsecured wireless network. In some examples, identifier-sending module 106 may broadcast the device identifier repeatedly until a reply is received by the network device.

At step 406, one or more of the systems described herein may receive, via the unsecured wireless network, an authentication token from the computing device. For example, token-receiving module 108 may, as part of network device 206 in FIG. 2, receive, via unsecured wireless network 204, token 210 from computing device 202.

In one embodiment, token-receiving module 108 may also receive an IP address for the network device from the computing device. For example, token-receiving module 108 may receive a message from the computing device that includes both an authentication token and an IP address. In another example, token-receiving module 108 may receive separate messages for the authentication token and the IP address. In this example, token-receiving module 108 may receive the authentication token via a secure channel such as HTTPS.

At step 408, one or more of the systems described herein may display the authentication token to a user of the network device. For example, displaying module 110 may, as part of network device 206 in FIG. 2, display token 210 to a user of network device 206.

Displaying module 110 may display the authentication token in a variety of ways. For example, if the authentication token is a string, displaying module 110 may display the authentication token on a screen. If the network device has a small screen, displaying module 110 may display the authentication token in several parts. In another example, displaying module 110 may print out the authentication token. If the authentication token is a series of sounds and/or flashes, displaying module 110 may display the authentication token by performing the series of sounds and/or flashes. For example, displaying module 110 may flash a green indicator light, a yellow indicator light, and then an amber indicator light. In another example, displaying module 110 may beep seven times. This may occur if the network device is a device, such as a speaker or a door opener, that does not have a display screen.

In some examples, displaying module 110 may display the authentication token by flashing a light to indicate that the authentication token is being displayed and/or producing a noise to indicate that the authentication token is being displayed. For example, displaying module 110 may catch a user's attention by beeping loudly and/or in a certain sequence before and/or while displaying the authentication token.

At step 410, one or more of the systems described herein may receive, via the unsecured wireless network, network credentials for a secure wireless network from the computing device in response to a user of the computing device confirming that the network device correctly displayed the authentication token and that the user of the network device would like to connect the network device to the secure wireless network. For example, credential-receiving module 112 may, as part of network device 206 in FIG. 2, receive, via unsecured wireless network 204, network credentials 212 for secure wireless network 214 from computing device 202 in response to a user of computing device 202 confirming that network device 206 correctly displayed token 210 and that the user of network device 206 would like to connect network device 206 to secure wireless network 214.

Credential-receiving module 112 may receive the network credentials in a variety of ways. For example, credential-receiving module 112 may receive an HTTPS message that includes the network credentials.

At step 412, one or more of the systems described herein may connect to the secure wireless network using the network credentials received via the unsecured wireless network. For example, connection module 114 may, as part of network device 206 in FIG. 2, connect to secure wireless network 214 using network credentials 212 received via unsecured wireless network 204.

Connection module 114 may use the network credentials to connect to the secure wireless network in a variety of ways. For example, connection module 114 may send a message including a key to the router and/or wireless access point that provides the secure wireless network.

Figure 5:
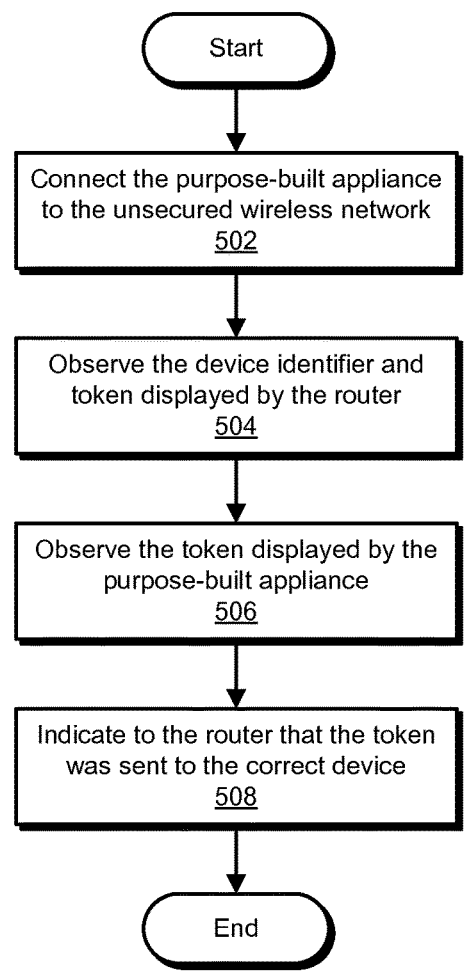
FIG. 5 is a flow diagram of an exemplary method for connecting purpose-built appliances to secure wireless networks.

In some examples, connection module 114 may connect to the secure wireless network using the network credentials without the user manually inputting the network credentials on the network device. For example, a user may connect a purpose-built appliance to a secure network by performing only two active steps. As illustrated in FIG. 5, at step 502 a user may connect a purpose-built appliance to an unsecured wireless network. In some examples, the user may do this by selecting the network from a list of available wireless networks displayed by the device. In other examples, the network device may automatically connect to any available unsecured wireless networks, as detailed above. At step 504, the user may observe the device identifier and token displayed by the router. Next, at step 506, the user may observe the token displayed by the purpose-built appliance. Finally, at step 508, the user may indicate to the router that the token was sent to the correct device. For example, the user may press a button on the router. After this, the router may send the network credentials to the purpose-built appliance and the purpose-built appliance may connect to the secure wireless network.

In some embodiments, the user may initially indicate to the router that the router should broadcast the unsecured wireless network. In other embodiments, the router may constantly broadcast the unsecured wireless network. In either case, the user may take a minimal number of actions in order to connect the purpose-built appliance to the secure wireless network.

Figure 6:
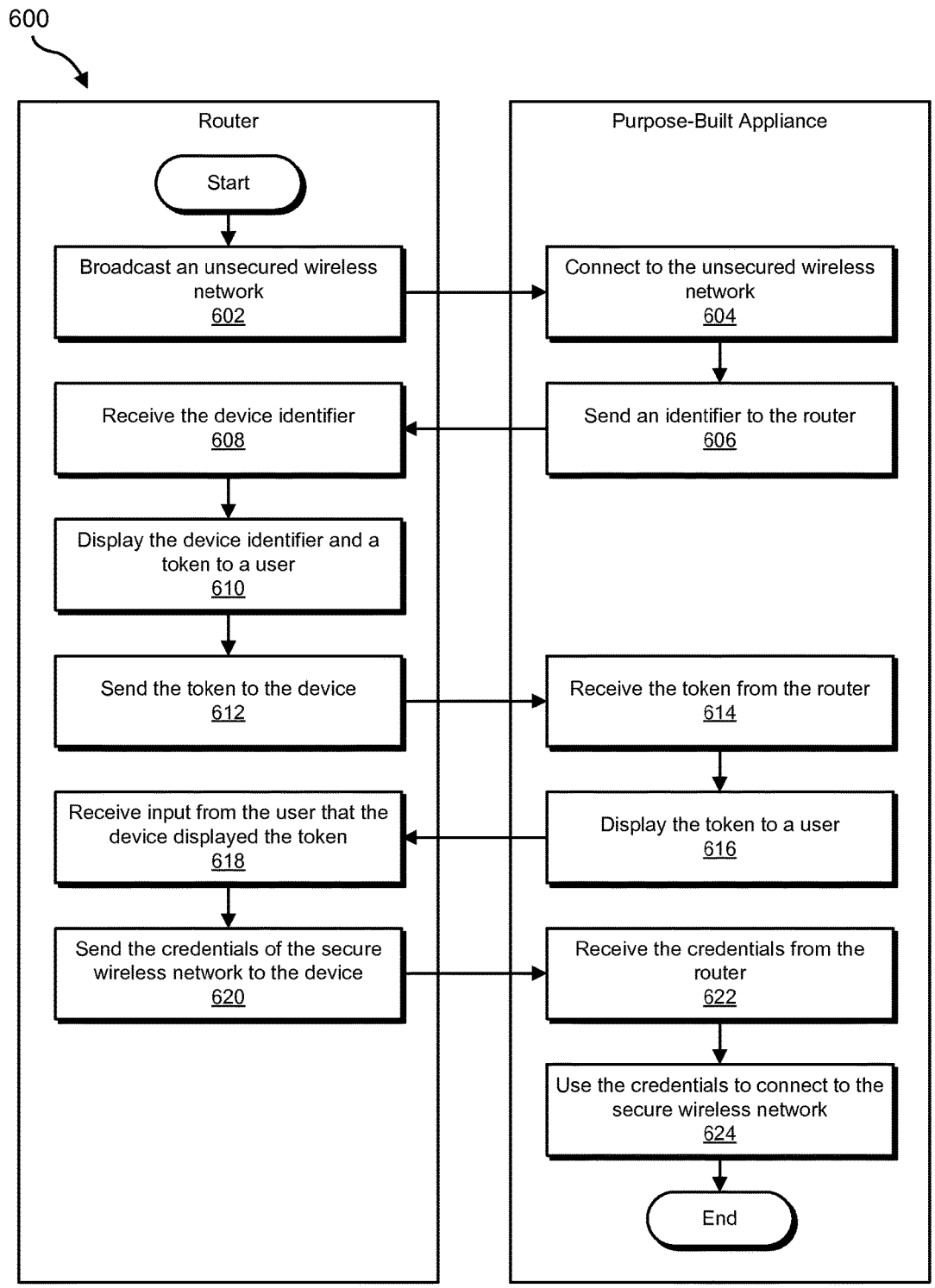
FIG. 6 is a flow diagram of an exemplary method for connecting purpose-built appliances to secure wireless networks.

Connecting the purpose-built appliance to the secure wireless network may involve minimal input from the user, but it may still involve several steps on each device involved. As illustrated in FIG. 6, at step 602 a router may broadcast an unsecured wireless network. In some examples, the unsecured wireless network may not be connected to the Internet and/or may be broadcast solely for the purpose of sending credentials to network devices. At step 604, a purpose-built appliance may connect to the unsecured wireless network. As detailed above, the purpose-built appliance may connect to the strongest network automatically or a user may select the network. Then, at step 606, the purpose-built appliance may send an identifier to the router. The identifier may include the device's name, its MAC address, and/or the device's manufacturer. At step 608, the router may receive the device identifier, and then, at step 610, the router may display the device identifier and a token to the user. At step 612, the router may send the token to the device. In some examples, the router may use a secure connection such as HTTPS to send the token.

At step 614, the purpose-built appliance may receive the token from the router. Next, at step 616, the purpose-built appliance may display the token to a user. At step 618, the router may receive input from the user that the device displayed the token and then at step 620 the router may send the credentials of the secure wireless network to the device. At step 622, the device may receive the credentials from the router and finally, at step 624, the device may use the credentials to connect to the secure wireless network. At this time, the device may also disconnect from the unsecured wireless network.

As explained in connection with methods 300 and 400 above, the systems described herein may allow a user to conveniently and securely connect a purpose-built appliance to a secure wireless network. First, the device may detect and connect to an unsecured wireless network broadcast for just such a purpose. The device may send an identifier to a router, which may respond with an IP address for the device and a random token. In some examples, the router may send the token via a secure channel, such as HTTPS. The device and router may both display the random token. Once the user has confirmed that the correct device is displaying the token, the router may send the secure network credentials to the device via the unsecured wireless network. The router may also use a secure channel to send the credentials. Once the device has received the credentials, it may connect to the secure wireless network. In this way, the device may connect to the secure wireless network without the user having to manually type in the network password on a limited user interface. In addition, by first sending the token and also by establishing a secure connection with the device, the router may be able to limit the likelihood that an attacker will intercept the network credentials and gain access to the secure wireless network.

Figure 7:
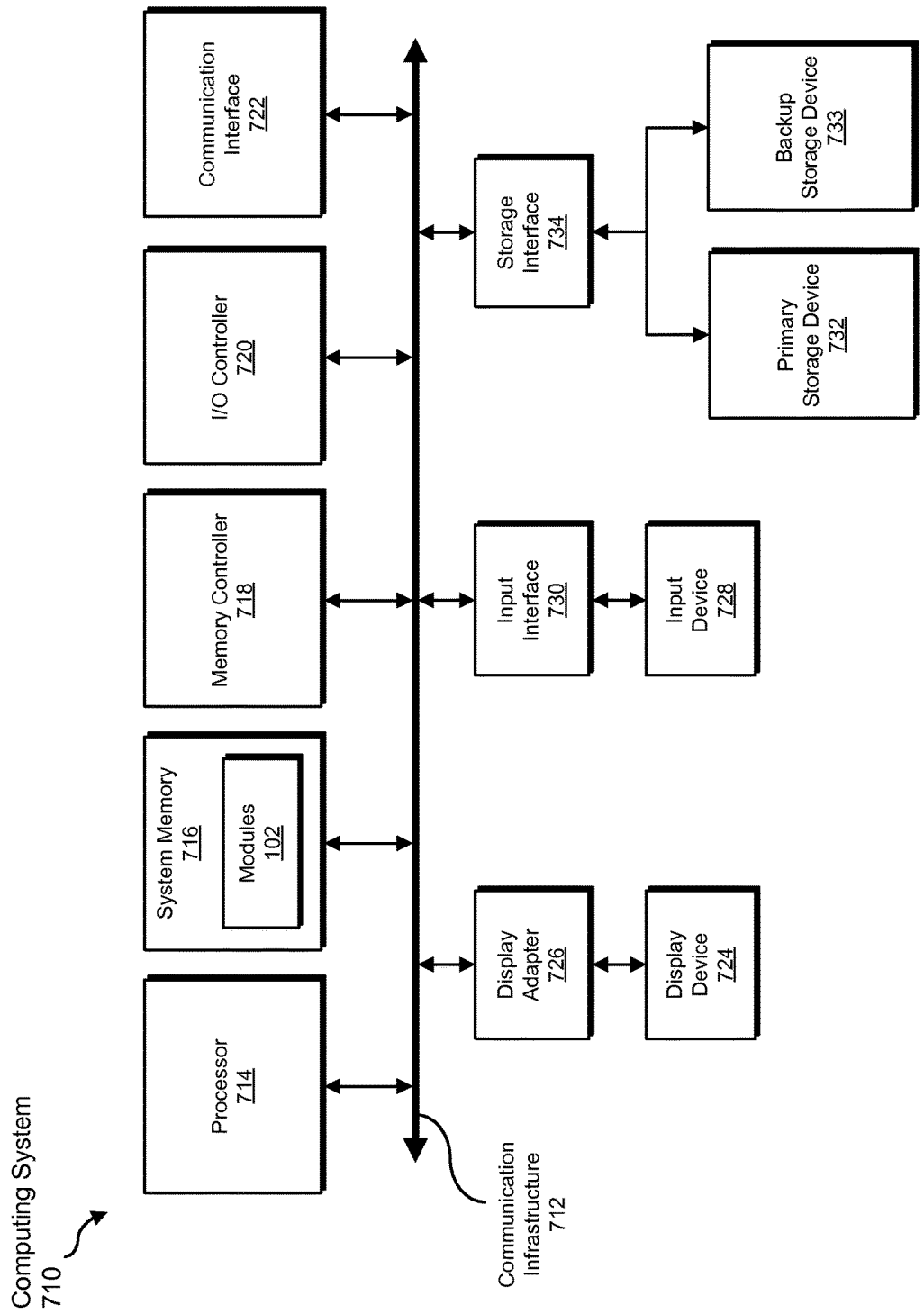
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
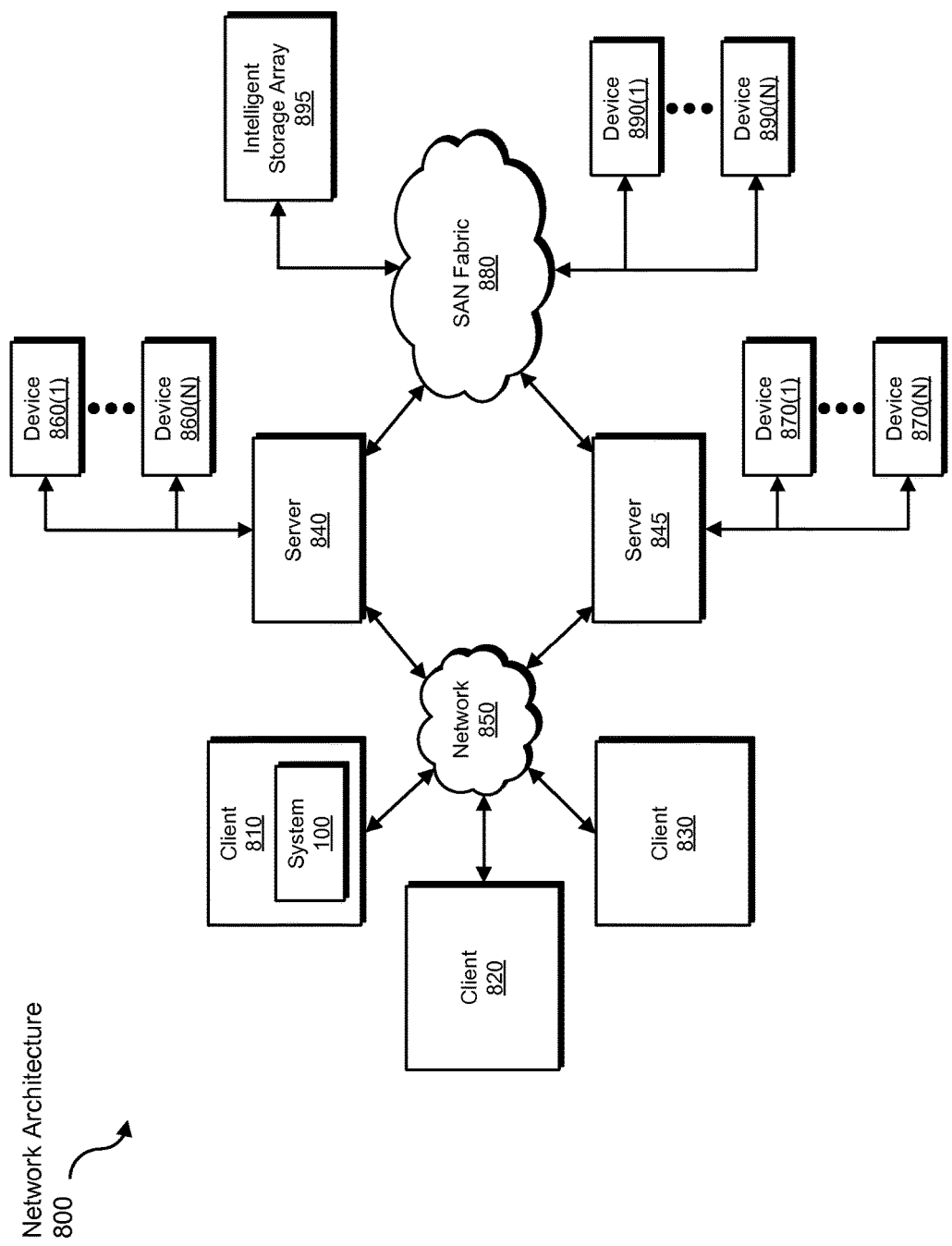
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for connecting purpose-built appliances to secure wireless networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive credential data to be transformed, transform the credential data into wireless network credentials, output a result of the transformation to a connection module, use the result of the transformation to connect to a secure wireless network, and store the result of the transformation to a network profile. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for connecting purpose-built appliances to secure wireless networks, at least a portion of the method being performed by a computing device comprising at least one processor, the method comprising:
   receiving, via an unsecured wireless network to which any device can connect without presenting valid network credentials, an identifier from a network device that is not connected to a secure wireless network and that comprises a purpose-built appliance with a limited user interface for entering the valid network credentials, wherein the secure wireless network:
      enables communication only between devices that have authenticated to the secure wireless network by presenting the valid network credentials; and
      is associated with the computing device;
   sending, via the unsecured wireless network, an authentication token that comprises an alphanumeric string to the network device;
   receiving, at the computing device, confirmation from a user of the network device that the network device correctly displayed the authentication token and that the user would like to connect the network device to the secure wireless network; and
   in response to the confirming that the user would like to connect the network device to the secure wireless network, sending, via the unsecured wireless network, the valid network credentials for the secure wireless network to the network device to enable the network device to connect to the secure wireless network.

2. The computer-implemented method of claim 1, wherein sending the valid network credentials for the secure wireless network to the network device comprises enabling the network device to connect to the secure wireless network without requiring the user to manually input the valid network credentials on the network device.

3. The computer-implemented method of claim 1, wherein the computing device comprises a network router that broadcasts the unsecured wireless network.

4. The computer-implemented method of claim 1, wherein sending, via the unsecured wireless network, the authentication token to the network device comprises sending the authentication token via an encrypted secure channel not readable by other devices connected to the unsecured wireless network.

5. The computer-implemented method of claim 1, further comprising, in response to receiving the identifier of the network device, sending an Internet Protocol address for the network device to the network device.

6. The computer-implemented method of claim 1, wherein the identifier of the network device comprises at least one of:
   a name of the device;
   a manufacturer of the device; and
   a media access control address of the device.

7. The computer-implemented method of claim 1, wherein receiving the confirmation from the user of the network device that the network device correctly displayed the authentication token comprises displaying to the user at least one of:
   the authentication token; and
   a list of network devices currently connected to the unsecured wireless network.

8. A computer-implemented method for connecting purpose-built appliances to secure wireless networks, at least a portion of the method being performed by a network device comprising at least one processor, the method comprising:
   identifying and connecting to an unsecured wireless network to which any device can connect without presenting valid network credentials;
   sending, via the unsecured wireless network, an identifier of the network device to a computing device that is associated with the unsecured wireless network, wherein the network device comprises a purpose-built appliance with a limited user interface for entering the valid network credentials;
   receiving, via the unsecured wireless network, an authentication token that comprises an alphanumeric string from the computing device;
   displaying the authentication token to a user of the network device;
   receiving, via the unsecured wireless network, the valid network credentials for a secure wireless network from the computing device in response to a user of the computing device confirming that the network device correctly displayed the authentication token and that the user of the network device would like to connect the network device to the secure wireless network, wherein the secure wireless network enables communication only between devices that have authenticated to the secure wireless network by presenting the valid network credentials; and
   connecting to the secure wireless network using the valid network credentials received via the unsecured wireless network.

9. The computer-implemented method of claim 8, wherein connecting to the secure wireless network using the valid network credentials comprises using the valid network credentials to connect to the secure wireless network without the user manually inputting the valid network credentials on the network device.

10. The computer-implemented method of claim 8, wherein displaying the authentication token to the user of the network device comprises displaying the authentication token on a screen of the network device.

11. The computer-implemented method of claim 8, wherein identifying and connecting to the unsecured wireless network comprises determining that the unsecured wireless network has the strongest signal of any available unsecured wireless network.

12. The computer-implemented method of claim 8, wherein identifying and connecting to the unsecured wireless network comprises receiving input from the user that directs the network device to connect to the unsecured wireless network.

13. The computer-implemented method of claim 8, wherein identifying and connecting to the unsecured wireless network comprises connecting to each available unsecured wireless network in turn for a predefined time period until an authentication token is received via the unsecured wireless network.

14. The computer-implemented method of claim 8, further comprising, in response to sending the identifier of the network device to the computing device, receiving an Internet Protocol address for the network device from the computing device.

15. The computer-implemented method of claim 8, wherein displaying the authentication token comprises at least one of:
  flashing a light to indicate that the authentication token is being displayed; and
  producing a noise to indicate that the authentication token is being displayed.

16. A system for connecting purpose-built appliances to secure wireless networks, the system comprising:
  an identification module, stored in memory of a network device that comprises a purpose-built appliance with a limited user interface for entering valid network credentials, that identifies an unsecured wireless network to which any device can connect without presenting the valid network credentials and connects the network device to the unsecured wireless network;
  an identifier-sending module, stored in memory of the network device, that sends, via the unsecured wireless network, an identifier of the network device to a computing device that is associated with the unsecured wireless network;
  an identifier-receiving module, stored in memory of the computing device that receives, via the unsecured wireless network, the identifier from the network device;
  a token-sending module, stored in memory of the computing device, that sends, via the unsecured wireless network, an authentication token that comprises an alphanumeric string to the network device;
  a token-receiving module, stored in memory of the network device, that receives, via the unsecured wireless network, the authentication token from the computing device;
  a displaying module, stored in memory of the network device, that displays the authentication token to a user of the network device;
  a confirmation module, stored in memory of the computing device, that receives confirmation from the user of the network device that the network device correctly displayed the authentication token and that the user would like to connect the network device to the secure wireless network that enables communication only between devices that have authenticated to the secure wireless network by presenting the valid network credentials;
  a credential-sending module, stored in memory of the computing device, that, in response to the confirming that the user would like to connect the network device to the secure wireless network, sends, via the unsecured wireless network, the valid network credentials for the secure wireless network to the network device;
  a credential-receiving module, stored in memory of the network device, that receives, via the unsecured wireless network, the valid network credentials for the secure wireless network from the computing device; and
  a connection module, stored in memory of the network device, that connects the network device to the secure wireless network using the valid network credentials received via the unsecured wireless network.

17. The system of claim 16, wherein the credential-sending module sends the valid network credentials for the secure wireless network to the network device to enable the network device to connect to the secure wireless network without requiring the user to manually input the valid network credentials on the network device.

18. The system of claim 16, wherein the computing device comprises a network router that broadcasts the unsecured wireless network.

19. The system of claim 16, wherein the token-sending module sends, via the unsecured wireless network, the authentication token to the network device by sending the authentication token via an encrypted secure channel not readable by other devices connected to the unsecured wireless network.

20. The system of claim 16, wherein, in response to the identifier-receiving module receiving the identifier of the network device, the token-sending module sends an Internet Protocol address for the network device to the network device.

* * * * *